United States Patent [19]

Braithwaite et al.

[11] Patent Number: 4,557,746
[45] Date of Patent: Dec. 10, 1985

[54] ELECTRO-PNEUMATIC ACTUATOR FOR GLASSWARE FORMING MACHINE

[75] Inventors: David Braithwaite, Doncaster, England; Richard A. Walker, North Granby, Conn.; Wasyl Bystrianyk, Simsbury, Conn.; Paul F. Scott, Granby, Conn.; Robert J. Douglas, North Granby, Conn.

[73] Assignee: Emhart Industries, Inc., Farmington, Conn.

[21] Appl. No.: 741,017

[22] Filed: Jun. 3, 1985

Related U.S. Application Data

[63] Continuation of Ser. No. 520,396, Aug. 4, 1983, abandoned.

[51] Int. Cl.[4] ............................................... C03B 9/40
[52] U.S. Cl. .......................................... 65/163; 65/68; 65/241; 65/DIG. 13; 92/2; 92/17; 92/31
[58] Field of Search ........... 65/68, 163, 241, DIG. 13; 92/31, 2, 17

[56] References Cited

U.S. PATENT DOCUMENTS

| 2,858,770 | 11/1958 | Reynolds | 92/31 |
| 3,083,592 | 4/1963 | Carlstedt | 92/17 X |
| 3,620,131 | 11/1971 | Nitkiewicz et al. | 92/2 |
| 4,203,752 | 5/1960 | Becker et al. | 65/163 |
| 4,388,576 | 6/1983 | Blatt | 318/571 |
| 4,409,013 | 10/1983 | Cardenas et al. | 65/DIG. 13 |

FOREIGN PATENT DOCUMENTS 3,033,754 3/1982 Fed. Rep. of Germany .......... 92/17

Primary Examiner—Arthur Kellogg
Attorney, Agent, or Firm—Arthur B. Moore

[57] ABSTRACT

An actuator for use in or with a glassware forming machine for pneumatically driving a member through a predetermined path, such member being, in one embodiment, a pusher cylinder for moving one or more glassware articles through a predetermined arcuate path. The velocity of the actuator is controlled according to a predetermined velocity profile and is effected by an electromechanical control means which controls the linear velocity of the piston of a pneumatic cylinder in one direction of motion.

14 Claims, 7 Drawing Figures

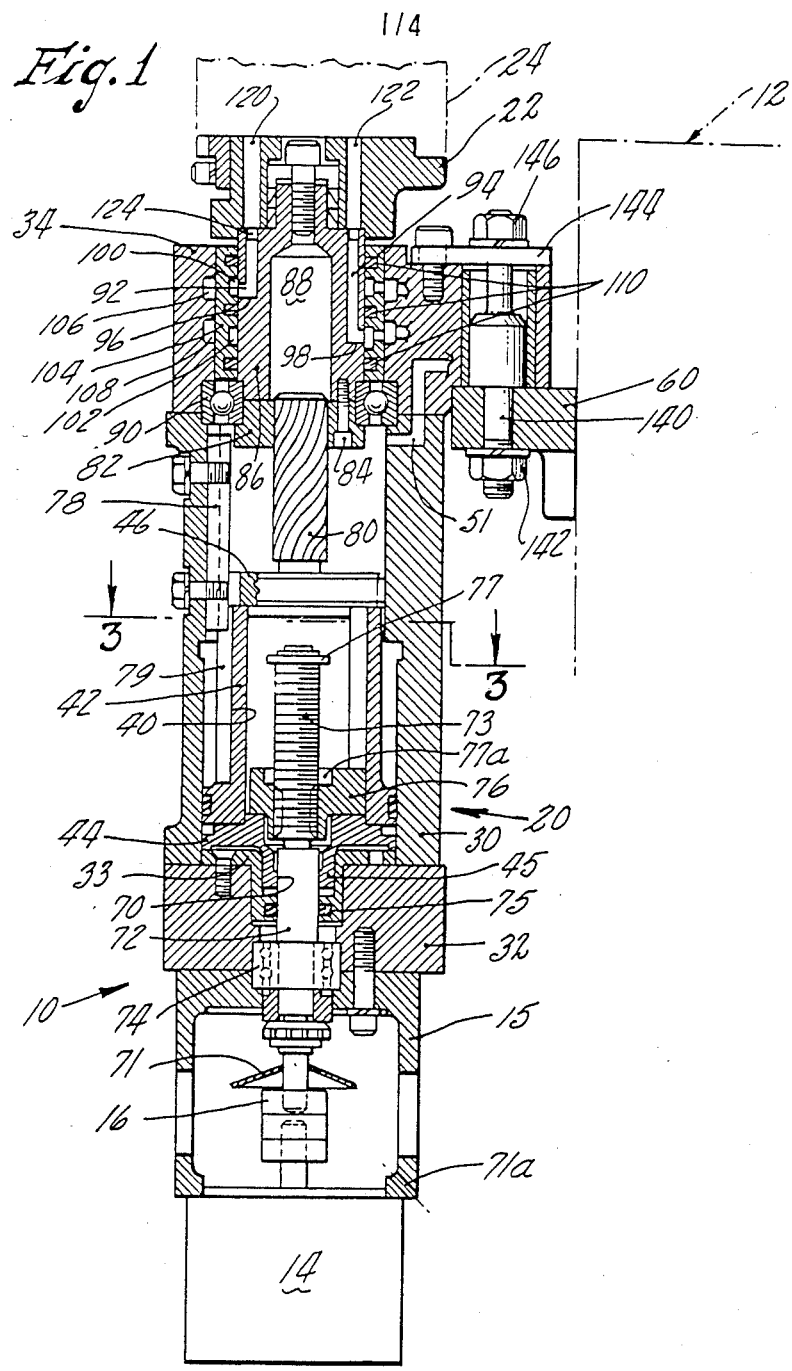

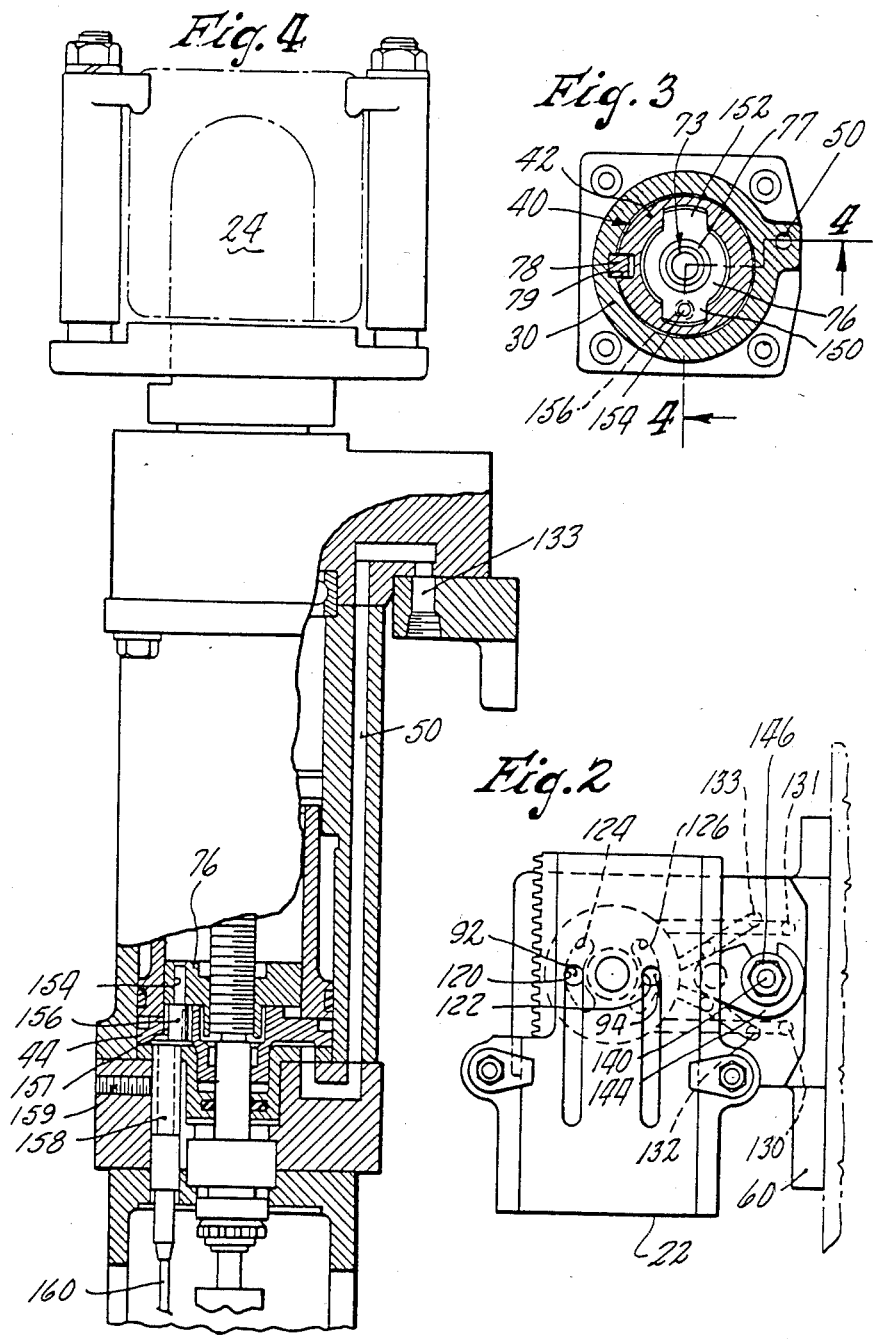

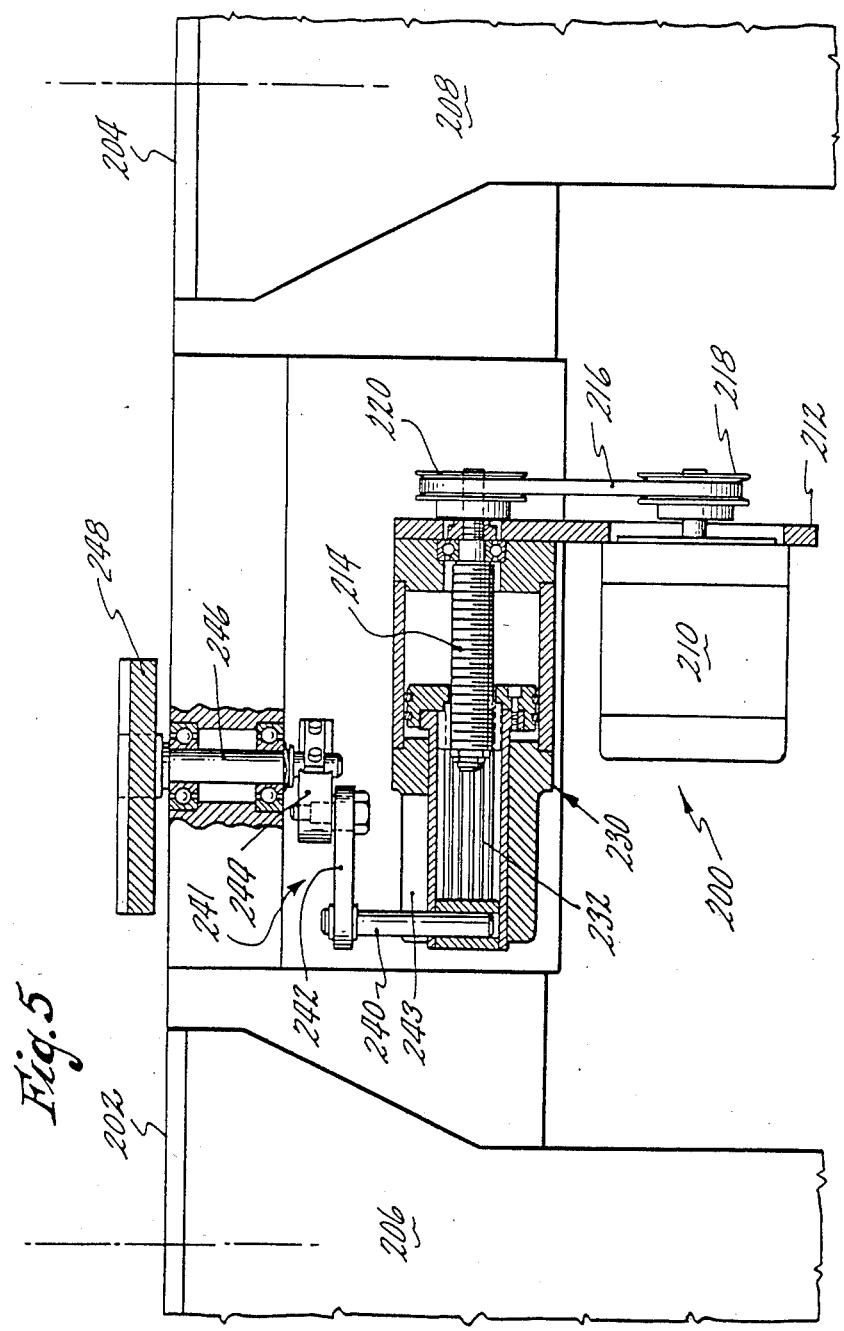

ELECTRO-PNEUMATIC ACTUATOR FOR GLASSWARE FORMING MACHINE

This is a continuation of co-pending application Ser. No. 520,396 filed on Aug. 4, 1983 abandoned.

BACKGROUND OF THE PRIOR ART

1. Field of the Invention

The invention relates generally to actuating mechanisms for moving various components of a glassware forming machine through their respective operating cycles. More specifically, the invention relates to pneumatic actuating mechanisms, the velocity of which is controlled eletromechanically in one direction of cyclical operation. Still more specifically, the invention relates to pusher mechanisms for moving glassware containers through a predetermined arcuate path from a dead plate on to a moving conveyor.

2. Description of the Prior Art

Pusher mechanisms for moving glassware articles from a dead plate to a moving conveyor are well known in the prior art. These devices generally include a pneumatic pusher cylinder or head and a rotary actuator means for moving it through a predetermined arcuate path. In operation, each pusher cylinder piston is in a retracted position prior to the deposition of one or more glassware articles on a corresponding dead plate. Extension of the piston rod end by conventional pneumatic means positions fingers at the end of the piston rod near the glassware articles. Movement of the pusher cylinder through an arcuate path is an operating stroke which causes the fingers to contact the ware and move it outwardly through an angle of approximately 90° onto a moving conveyor belt. The piston rod is then retracted and the pusher cylinder returned inwardly on a return stroke in the opposite arcuate direction to complete the cycle.

The arcuate outward velocity of the pusher cylinder is important since it must be slow enough at the start of the cycle so as not to make unstable or break the glassware upon contact with the fingers and subsequently fast enough to match the arcuate glassware velocity to the conveyor velocity.

In the prior art such pusher mechanisms are often mechanical devices where the pusher cylinder piston motion is caused pneumatically and the rotary motion of the pusher cylinder is provided through appropriate gearing from a common mechanical drive train. Each section of the glassware forming machine has a separate pusher mechanism associated with it although each mechanism is driven by a single motor via a common drive shaft. These prior art mechanical devices prove troublesome from the point of view of adjusting the timing of the individual pusher mechanisms to the operation of other mechanical components of the glassware forming machine. Moreover, the velocity profile of the arcuate movement of each pusher cylinder is difficult to adjust because it depends upon the profile of a cam associated with each mechanism. Selection of a different velocity profile for the pusher mechanism of one or more sections requires replacement of the associated cam which means stopping the entire conveyor.

More recently, electronic pusher mechanisms have been produced where each pusher mechanism may be driven independently of the others according to a predetermined velocity profile by an electric motor controlled by a common control means. In some such prior art units several velocity profiles may be stored in memory and recalled at will. Examples of such prior art electronic pushers are shown in U.S. Pat. Nos. 4,203,752 and 4,313,750.

Each of these prior art electronic pushers requires a relatively large electric motor in driving connection with the pusher cylinder in order to control its arcuate movement in both directions (both inward and outward arcuate strokes). Because the pusher cylinder is a relatively massive component these electric motors are necessarily large and require high torque, thus making these prior art electric pusher mechanisms costly and inefficient. Moreover, the return stroke of the pusher cylinder in such prior art electric pushers is constrained by the ability of the electric motor to move the relatively massive cylinder head.

Accordingly, it is an object of this invention to produce an actuating apparatus for cyclically moving a member through a predetermined arcuate path. It is a further object to produce an actuating apparatus having a fluidic driving means and an electromechanical control means. Note that the term "fluidic" as used herein means either pneumatic or hydraulic. It is still another object of this invention to produce such an apparatus wherein the velocity of the driving means is controlled. A further object of this invention is to produce a pusher mechanism embodying the principles of the foregoing actuating apparatus in order to move a pusher cylinder through a predetermined arcuate path.

Furthermore, prior art pusher mechanisms, regardless of how the rotary actuator is driven, generally supply pushout and retract air to the pusher cylinder via two separate fluidic or air passages. These passages are provided in the base portion upon which the turntable (supporting the pusher cylinder) is mounted and communicate with ports in the turntable at predetermined angular positions thereof. Consequently, the pushout and retract functions are restricted to occur only at certain points in the pusher mechanism's operating cycle.

It is, therefore, another object of this invention to produce a pusher mechanism wherein the pusher cylinder may be actuated at any desired point in the operating cycle thereof.

SUMMARY OF THE INVENTION

These and other objects of this invention are achieved by the preferred embodiment disclosed herein which is an apparatus for moving a member cyclically along a predetermined path comprising: fluidic drive means in driving connection with said member and control means for controlling the velocity of said fluidic drive means. More particularly the invention comprises an apparatus for cylically driving a member along a predetermined arcuate path comprising:
 a motor;
 a threaded shaft for being rotated by said motor;
 a piston and cylinder assembly for being fluidically activated to move the piston;
 a control nut in threaded engagement with said threaded shaft;
 means enabling contiguous engagement of said control nut with said piston during motion thereof in a predetermined direction;
 converting means for converting the linear motion of said piston to arcuate motion of said member.
 In one embodiment the converting means comprises:

a first helically splined surface secured to said piston for linear motion therewith; and a rotatable hub having a second helically splined surface in complementary engagement with said first helically splined surface and for being rotated by the linear motion thereof.

BRIEF DESCRIPTION OF THE DRAWINGS

FIG. 1 is a side elevational view, partly in cross-section, of an electro-pneumatic drive mechanism constructed in accordance with the principles of this invention;

FIG. 2 is a plan view of FIG. 1 showing some elements in phantom;

FIG. 3 is a sectional view of FIG. 1 taken along the lines 3—3;

FIG. 4 is an elevational sectional view of FIG. 3, partially cut away, taken along the lines 4—4 and including a diagrammatic end view of a pusher cylinder mounted on the turntable;

FIG. 5 is a side elevational view, partly in cross-section, of an alternate embodiment of this invention;

DESCRIPTION OF THE PREFERRED EMBODIMENT

Figure 7:
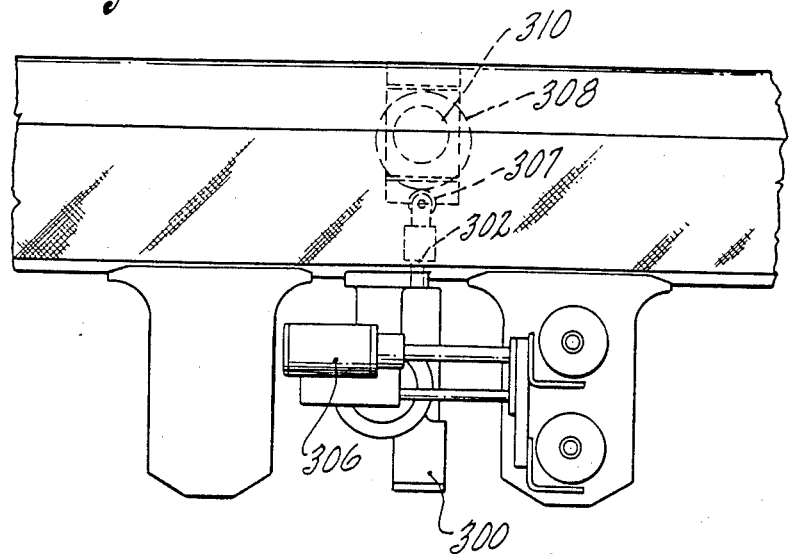
FIG. 7 is a plan view of FIG. 6.

Referring now to FIG. 1 there is shown a side elevational view, in cross-secton, of electro-pneumatic pusher mechanism 10 mounted adjacent conveyor 12. Pusher mechanism 10 basically comprises motor 14, piston and cylinder assembly 20, turntable 22 and pusher cylinder 24 (shown partially cut away).

Piston and cylinder assembly 20 comprises cylinder wall 30, lower and upper cylinder caps 32 and 34, respectively, and piston 40 which further comprises piston body 42, and lower and upper piston caps 44 and 46, respectively. Piston 40 is pneumatically driven longitudinally within assembly 20 by conventional means. Air line 50 (best seen in FIG. 4) allows the communication of pushout air to the bottom surface of lower piston cap 44 while another air line 51 provides return air to top surface of piston cap 46. All air lines within pusher 10 are fed from a manifold within mounting bracket 60 beat explained below with reference to FIG. 2.

While the driving force for piston 40 is pneumatic, its longitudinal (linear) velocity is controlled electrically in one direction by motor 14, as will be explained below. Motor 14 may be, for example, a digital stepping motor under the control of a micrprocessor or other control circuit (not shown). Alternatively, motor 14 may be a linear actuator or other suitable means which may be controlled to effect the operation described herein.

Piston 40 is hollow and its lower cap 44 is provided with an axial aperture 70 to permit a shaft 72 to extend into the hollow piston. Shaft 72 has a threaded end 73 and extends through a lower cylinder cap 32 and motor mounting bracket 15. Shaft 72 is connected by a coupling 16 to the output shaft of motor 14. Appropriate sealed bearings 74 and shaft seals 75 serve to enable sealed rotation of shaft 72 within piston and cylinder assembly 20. A conical oil flinger 71 is secured to shaft 72 to prevent oil from dripping on motor 14, the oil being drained through a drain hole 71a. Threaded control nut 76 is threadably engaged with shaft end 73, and, as best seen in FIG. 3, is prevented from rotating therewith, thus constraining it to move only longitudinally in response to rotation of shaft 72. Similarly, rotation of piston 40 is prevented by key 78 cooperating with recess 79 (best seen in FIG. 3). Restraining washer 77 is secured by a retaining clip to the end of shaft 72 to limit motion of nut 76. Recess 77a provides clearance for washer 77.

Lower piston cap 44 is provided with a tapered extension 45 which mates with a complementary bronze insert 33 secured to cylinder end cap 32. Insert 33 provides a pneumatic cushion and facilitates alignment and seal retention.

Upper piston cap 46 has welded or otherwise secured to it a helically splined shaft 80 which is in operative engagement with a complementarily splined hub 82 rotatably mounted within upper cylinder cap 34. Hub 82 is secured by bolts 84 (only one of three shown) to spline cap 86 which is provided with a recess 88 to receive shaft 80 upon extension of piston 40. Bearing 90 permits rotation of hub 82 and cap 86 relative to cylinder cap 34. Hub 82 and cap 86 comprise a converting means for converting the linear, longitudinal motion of piston 40 to horizontal arcuate motion of turntable 22. Spline cap 86 is provided with a circular cross-section extend-air pressure 92 and retract-air passage 94 for communicating pusher cylinder operating air to turntable 22. These passages are diametrically opposed as best seen in FIG. 2. The lower supply end port 96 of passage 92 and the lower supply end port 98 of passage 94 are each of circular cross-section and at predetermined (vertical) locations on spline cap 86. Supply end ports 96 and 98 open to annular air channels 100 and 102, respectively, within sleeve 104. Air channels 100 and 102 are in turn connected to corresponding annular air channels 106 and 108, respectively, in cylinder cap 34 by means of several small supply apertures (not shown) in the wall of sleeve 104. This construction was selected because cylinder cap 34 is, in the preferred embodiment, cast aluminum and it is not desirable to have spline cap 86 rotate within such material. Thus, sleeve 104 is used as an intermediate bearing and may be made of material such as bronze. A plurality of seals 110 permit sealed rotation of cap 86 within sleeve 104.

Turntable 22 is bolted to the top of supporting spline cap 86 so as to enable communication between air passages 92 and 94 and 120 and 122, respectively. As best seen in FIG. 2 alignment of turntable 22 on cap 86 is facilitated by forming the top ends of air passages 92 and 94 into arcuate channels 124 and 126, respectively. Turntable 22 is not keyed to spline cap 86 and air passages 124 and 126 are arcuate to enable alignment of the turntable with the dead plate during installation.

Referring to FIGS. 1 and 2 it will be noted that mounting bracket 60 also serves as an air manifold to communicate air from supply lines (not shown) connected to the bottom of bracket 60. Bracket 60 contains four air passages 130, 131, 132 and 133. Passages 130 and 131 provide extend and retract air, respectively to the pusher cylinder via air channels 100 and 102 as explained above. Passages 132 and 133 provide pushout and return air to pusher mechanism 10 via air lines 50 and 51, respectively. The connection between passage 133 and air line 50 is best seen in FIG. 4. Air passage 132 is similarly connected in air line 51 (best seen in FIG. 1).

Pusher mechanism 10 in connected to bracket 60 via mounting pin 140 which is secured to bracket 60 by nut 142. Pivotable washer 144 and top nut 146 connect pusher mechanism 10 to pin 140 and provide a quick release feature enabling the entire mechanism to be easily replaced.

Referring now to FIG. 3 is will be noted that piston 40 is keyed within cylinder wall 30 by key 78 and recess 79. Nut 76 is keyed within piston 40 by flange portions 150 and 152, the former being provided with chamfered aperture 154 for receiving a steel pin 156, best seen in FIG. 4. Lower piston cap 44 is provided with aperture 157 for loose mateable engagement with pin 156 to permit it to be placed within operative distance to proximity transducer 158 embedded within lower cylinder cap 32. Transducer 158 is secured by set screw 159 and has wires 160 connected to a control means (not shown). The transducer serves to detect a zero position of nut 76 in order to facilitate synchronization.

An alternate embodiment of the invention is shown in FIG. 5 which discloses a side elevational view of pusher mechanism 200 mounted between two adjacent dead plates 202 and 204 and cooling boxes 206 and 208. Motor 210 is horizontally mounted to support plate 212 and operatively connected to threaded shaft 214 by belt 216 and pulleys 218 and 220. The operation of shaft 214 within piston and cylinder assembly 230 is similar to that of shaft 72 shown in FIG. 1. Accordingly, the details of assembly 230 will not be repeated here. It will be noted that the embodiment of FIG. 1 shows piston 40 in a retracted position while that of FIG. 5 shows the piston in an extended position. One difference between this horizontal embodiment and the vertical embodiment shown in FIG. 1 is that shaft 232 secured to the piston has straight splines and is fixedly connected to a link 240 which is in turn pivotably connected to crank means 241 (i.e. links 242 and 244). Link 244 is in turn fixedly connected to support shaft 246 which supports turntable 248. The pusher cylinder is not shown since any suitable conventional pusher arrangement may be employed. Also, the details concerning the unmentioned components shown in FIG. 5 are not presented since one skilled in the art will know how to implement the embodiment disclosed.

In operation, link 240 moves linearly within slot 241 formed in an extension of piston and cylinder assembly 230. This causes pivotal motion of crank means 241 which comprises links 242 and 244. Motion of link 240 causes link 242 to pivot about the end of link 240 and link 244 to pivot about the end of link 242. Since link 244 is fixedly connected to shaft 246, the linear motion of link 240 is converted to arcuate motion of turntable 248.

Figure 6:
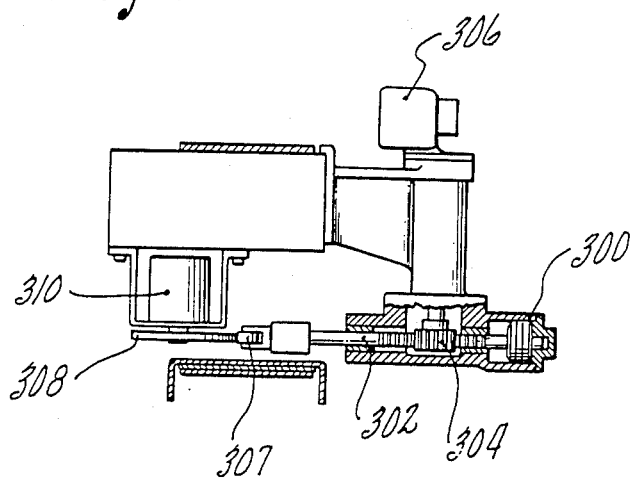
FIG. 6 is a side elevational view of another alternate embodiment of the invention.

Yet another alternate embodiment of the invention is shown in FIGS. 6 and 7. FIG. 7 also shows, diagrammatically, a conveyor, two dead plates and containers. This embodiment shows the use of pneumatic piston and cylinder assembly 300 for driving rack 302. Pinion 304 in operative engagement with rack 302 converts the linear motion of the piston to arcuate motion of pusher cylinder 306. Rack 302 has a cam follower 307 at its other end and its velocity in one direction is controlled by cam 308 which is rotated by motor 310 under the control of a microprocessor or other control circuit (not shown). Motion of the rack in the other direction is totally pneumatic and unrestrained.

It will be noted that numerous other fluidically driven means could be employed to move a pusher cylinder or other member along a predetermined arcuate path while controlling the motion in only one direction. The control may be applied at numerous points along the drive train between the fluidic actuator and member to be moved.

In operation, a control system (not shown) initiates each operating cycle of pusher mechanism 10 at predetermined points in the machine (or individual section) cycle. Each operating cycle starts from the zero position sensed by proximity transducer 158. Pusher cylinder 24 is placed in the extend position and the control system provides to motor 14 a predetermined series of digital pulses to rotate its output shaft according to a selected velocity/displacement profile. Simultaneously, extend air is applied to drive piston 40 upward on its operating stroke. The linear velocity of piston 40 is controlled by the rate with which nut 76 advances along shaft 72, this rate being restrained by the rotation of motor 14. This controlled linear piston velocity in turn causes controlled rotation of hub 82, turntable 22 and pusher cylinder 24. It will be noted that the annular air channels around spline cap 86 enable extension or retraction of the piston of pusher cylinder 24 at an point along its arcuate path. Once pusher mechanism 10 has completed its operating stroke (i.e. moving pusher cylinder 24 arcuately in one direction to place ware on the conveyor) retract air is applied to retract piston 40 (as well as the pusher cylinder piston) and control signals are applied to motor 14 to reverse its rotation. It will be noted that the return stroke of piston 40 is pneumatically driven without any control. Generally the piston's return velocity will exceed the linear velocity of nut 76 to avoid contact therebetween on the return stroke.

Pusher mechanism 10 may be converted from right to left-hand operation by changing splined shaft 80 and corresponding hub 82. In the preferred embodiment this requires changing the upper piston cap 46.

Those skilled in the art will understand that numerous modifications amd improvements may be made to the preferred embodiment of the invention disclosed herein without departing from the spirit and scope thereof.

What is claimed is:

1. An apparatus for providing controlled motion of a mechanism in a glassware forming machine, comprising:
    a motor;
    a threaded shaft rotated by said motor;
    a piston and cylinder assembly, fluidically activated to move the piston in opposite first and second directions, said piston being drivingly coupled to said mechanism; and
    a control nut in threaded engagement with said threaded shaft, which is longitudinally moved by the rotation of the shaft in the first and second directions, said control nut being non-rotatably mounted relative to said piston and cylinder assembly so as to contiguously engage said piston to limit its motion in the first direction, and to disengage said piston to permit free motion in the second direction.

2. Apparatus as defined in claim 1, further comprising:
    an annular flange coaxially aligned with said piston and secured thereto, said flange for abutting one side of said control nut upon motion secured to said supporting structure at a plurality of angular positions with respect thereto, and wherein said first fluidic passage further comprises a third and fourth fluidic passage, said third fluidic passage being fixed relative to said turntable and said fourth fluidic passage being fixed relative to said supporting structure, one of said third or fourth fluidic passages having a substantially arcuate shape along the interface of said turntable and supporting structure to enable operative engagement therebetween along a predetermined range of said angular positions.

3. An apparatus according to claim 2 wherein said member supports a pusher cylinder.

4. An apparatus according to claim 3 wherein said member further comprises a cylindrical support, said support being arcuately cyclically moved about its axis relative to said base, said second fluidic passage being an annular channel abutting the cylidrical surface of said support, said annular channel in operative connection with a third fluidic passage fixed relative to said base, said first fluidic passage terminating in at least one port on the cylindrical surface of said support.

5. Apparatus as defined in claim 1, further comprising means for converting the linear motor of said piston to arcuate motion of said mechanism.

6. An apparatus according to claim 5 wherein said converting means comprises:
- a first helically splined surface secured to said piston for linear motion therewith;
- a rotatable hub having a second helically splined surface in complementary engagement with said first helically splined surface and for being rotated by the linear motion thereof.

7. An apparatus according to claim 5 wherein said converting means comprises:
- a link fixedly secured to said piston for linear motion therewith;
- a crank means pivotally secured to said link for being pivoted thereby, said crank means operatively connected to said member.

8. An apparatus according to claim 5 wherein said motor is responsible to control signals and further comprising:
- a control means for producing control signals to move the output shaft of said motor according to a predetermined velocity profile.

9. An apparatus for arcuately moving a pusher cylinder to move at least one article from a dead plate onto a moving conveyor comprising:
- a motor responsive to control signals;
- a control means for producing said control signals to move the output shaft of said motor according to a predetermined velocity profile;
- a threaded shaft rotated by said motor;
- a piston and cylinder assembly, fluidically activated to move the piston in opposite first and second directions, said piston being drivingly coupled to a linear-to-rotary motion converter;
- a control nut in threaded engagement with said threaded shaft, which is longitudinally moved by the rotation of the shaft in the first and second directions, said control nut being non-rotatably mounted relative to said piston and cylinder assembly so as to contiguously engage said piston to limit its motion in the first direction, and to disengage said piston to permit free motion in the second direction;

wherein the pusher cylinder is coupled to the linear-to-rotary motion converter so that the linear motion of the piston assembly results in corresponding arcuate motion of the pusher cylinder.

10. Apparatus as defined in claim 9 wherein the linear-to-rotary motion converter comprises:
- a helically splined member fixed to said piston to move therewith;
- a splined hub means in complementary engagement with said splined surface and for being arcuately moved thereby;
- a mounting plate secured to said hub means, said mounting plate for supporting said pusher cylinder.

11. An apparatus according to claim 10 wherein said helically splined member is an integral part of said piston.

12. An apparatus according to claim 10 further comprising:
means for sensing a predetermined position of said control nut relative to said threaded shaft, said sensing means being operatively connected to said control means.

13. Apparatus as defined in claim 9, further comprising:
an annular flange coaxially aligned with said piston and secured thereto, said flange for abutting one side of said control nut upon motion secured to said supporting structure at a plurality of angular positions with respect thereto, and wherein said first fluidic passage further comprises a third and fourth fluidic passage, said third fluidic passage being fixed relative to said turntable and said fourth fluidic passage being fixed relative to said supporting structure, one of said third or fourth fluidic passages having a substantially arcuate shape along the interface of said turntable and supporting structure to enable operative engagement therebetween along a predetermined range of said angular positions.

14. An apparatus for providing controlled motion of a mechanism in a glassware forming machine, comprising:
- a motor;
- a threaded shaft rotated by said motor;
- a piston and cylinder assembly, fluidically activated to move the piston in opposite first and second directions;
- a control nut in threaded engagement with said threaded shaft, which is longitudinally moved by the rotation of the shaft in the first and second directions, said control nut being non-rotatably mounted relative to said piston and cylinder assembly so as to contiguously engage said piston to limit its motion in the first direction, and to disengage said piston to permit free motion in the second direction, and
- a motion converter assembly for linking the piston to the mechanism and converting the linear motion of the piston to a desired motion of the mechanism.

* * * * *